Figure 1:
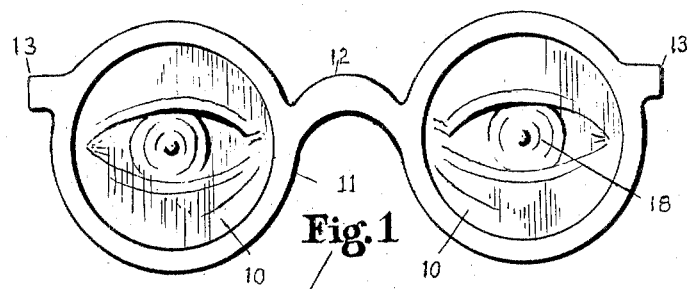

Dec. 10, 1929.   J. A. SMITH   1,739,049

SPECTACLES AND GOGGLES

Filed June 18, 1924

INVENTOR
*John Anthony Smith*
BY
*L. L. Westfall*
ATTORNEY

Patented Dec. 10, 1929

1,739,049

UNITED STATES PATENT OFFICE

JOHN ANTHONY SMITH, OF SPOKANE, WASHINGTON

SPECTACLES AND GOGGLES

Application filed June 18, 1924. Serial No. 720,762. REISSUED

My invention relates to an improved construction of spectacle and goggle frames, by means of which the field of vision of the wearer is enlarged and additional protection afforded to life and limb when moving across the path of city travel, or other moving objects.

As spectacle frames are now generally constructed they are comprised of two component parts, to wit: the front, composed of nosepiece and rims for the purpose of holding the lenses before the eyes of the wearer and two temples, one right and one left, for the purpose of holding the front in correct position on the face of the wearer.

In accordance with the general custom, these temples, or side pieces, are attached to the outer edge of the rims holding the lenses at a point coincident with the points at which a horizontal plane passing through the pupils of the eyes of the wearer cuts the outer edge of said rims. As a consequence of this method of construction the materials of the temples is on the same horizontal plane with the pupils of the eyes of the wearer, with the result that should the wearer endeavor to obtain a vision of an object on either side, without first turning his head so as to obtain a direct line of vision of said object, his vision is impeded to the extent to which the material of which the temples or side pieces are composed interferes with his line of vision. As will be readily seen in cases where, as is now in very common use, the spectacle frames are composed of horn, shell, celluloid products, or other material necessitating temples of heavy construction so as to secure the desired strength and rigidity, this interference may prove to be a serious bar to side vision, and in the case of crossing of modern city streets, at right angles to the line of traffic, may result in serious danger to the life and limb of the wearer as the result of his inability to obtain a clear view of approaching automobiles and other moving objects, which owing to the dark field caused on either side of the wearer as the result of the interference of the temple material with his side vision, are thus given an opportunity to come upon such wearer from either side, within the area of such dark field, without the wearer being warned of their approach.

In order to eliminate this dark field, thereby securing to the spectacle or goggle wearer an unimpeded side field of vision, as is the case with the natural eye, I have invented a spectacle frame in which the point of attachment of the temples or side pieces to the front is raised to a point substantially above the points at which the horizontal plane passing through the pupils of the eyes of the wearer cuts the outer edge of the rims of the front, with the result that when the glasses are worn, the material of which the temples are composed in no way interferes with the side vision of the spectacle wearer and, even while wearing the spectacles, he has at all times, without the necessity of turning his head in order to obtain a direct vision of objects approaching from either side, as free and untrammeled vision of such objects as if he were at the time actually not wearing spectacles. Or in other words the dark field on either side, caused by the interference of the temples with the side vision of the wear, and the resultant danger to life and limb, is entirely eliminated.

It will be seen from the foregoing that the essence of my invention consists in the raising of the points of attachment of the temples to the front to a point substantially above the points at which the horizontal plane passing through the pupils of the eyes of the wearer cuts the outer edges of the spectacle rims, and that the form of the front, or the material of which it is composed, or the form of the temples, or the material of which they are composed, or the method of attachment used, whereby the temples are attached to the front, are merely incidental, and may be varied to suit the individual taste or requirement of those who may wish to avail themselves of the improved method of spectacle construction embodied herein.

Figure 2:
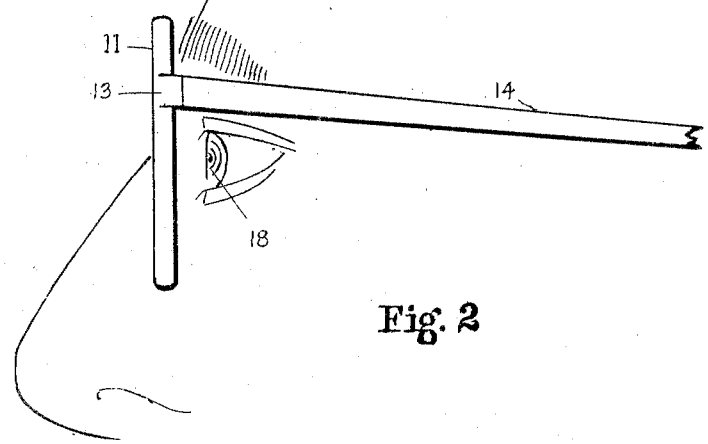
Figure 3:
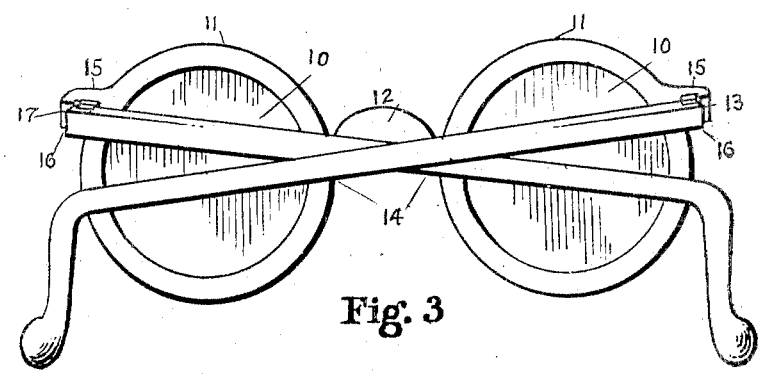

The invention will be hereinafter particularly described, pointed out in the claims and illustrated in the accompanying drawing, in which Figure 1 is a front view of a spectacle frame, the direct view showing only a front— comprising two rims, lugs for connecting temples and a nosepiece, the rims containing lenses, the temples broken away, and illustrating the position of the eyes of the wearer with relation to the position of the point of temple attachment on the frame front. Figure 2 is a side view of the same in position on the human head and illustrating the relative position of the temples and the pupils of the eyes; and Figure 3 is a rear view of the same, showing a front containing lenses, with temples attached in a folded position.

In a detail description, in which like numerals refer to like parts throughout the several views, the lenses 10 are mounted as usual in rims 11 connected by a nosepiece 12. At points substantially above points at which a horizontal line projecting through the center of the pupils of the eyes 18 intersects the outer edges of the rims 11 are laterally projecting lugs 13, to which are secured the temples 14, which arrangement leaves the side field of vision of the wearer clear, as shown in Figure 2. The joining of the temples 14 to the lugs 13 may be any connection that will permit of the folding of the temples 14, such as hinges 15, as shown in Figure 3. The temples have squared ends 16 so that when the temples 14 are expanded for use, as shown in Figure 2, these squared ends 16 of the temples 14 will have a firm setting against the portions or faces 17 of the lugs 13.

In accordance with the patent statutes I have described the principle of my invention, together with the construction which I consider to represent the best embodiment thereof, but I desire it understood that the construction shown is merely illustrative, that the invention may be carried out by other means and applied to uses other than those above set forth within the scope of the following claim.

What I claim is:

In spectacles, a frame having laterally projecting temple lugs flush with the inner faces of the rims and located substantially above the horizontal axis of the rims which passes through the center line of the pupils of the eye, temples having squared ends and hinged to the lugs, the hinge joints being inset from the free ends of the lugs in such manner that the temples will cross the front, and will have a firm setting against the flush faces of the lugs when the temples are expanded to hold the lens at a proper angle.

In testimony whereof, I affix my signature.

JOHN ANTHONY SMITH.